United States Patent
Ito

(10) Patent No.: US 12,525,640 B2
(45) Date of Patent: Jan. 13, 2026

(54) METHOD FOR PRODUCING SULFIDE SOLID ELECTROLYTE INCLUDING Sn

(71) Applicant: MITSUBISHI GAS CHEMICAL COMPANY, INC., Tokyo (JP)

(72) Inventor: Tomohiro Ito, Niigata (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 779 days.

(21) Appl. No.: 17/792,524

(22) PCT Filed: Jan. 6, 2021

(86) PCT No.: PCT/JP2021/000182
§ 371 (c)(1),
(2) Date: Jul. 13, 2022

(87) PCT Pub. No.: WO2021/145248
PCT Pub. Date: Jul. 22, 2021

(65) Prior Publication Data
US 2023/0071336 A1 Mar. 9, 2023

(30) Foreign Application Priority Data
Jan. 17, 2020 (JP) .................. 2020-005850

(51) Int. Cl.
*H01M 10/0562* (2010.01)
*C01B 25/14* (2006.01)
*H01M 10/0525* (2010.01)

(52) U.S. Cl.
CPC ......... *H01M 10/0562* (2013.01); *C01B 25/14* (2013.01); *C01P 2002/72* (2013.01);
(Continued)

(58) Field of Classification Search
CPC ......... H01M 10/0562; H01M 10/0525; H01M 2300/0068; H01M 10/052; C01B 25/14;
(Continued)

(56) References Cited

U.S. PATENT DOCUMENTS

2009/0252935 A1  10/2009  Koyama et al.
2015/0017548 A1   1/2015  Kato et al.
2018/0175447 A1   6/2018  Kanno et al.
(Continued)

FOREIGN PATENT DOCUMENTS

CN    105098228 A    11/2015
CN    108695553 A    10/2018
(Continued)

OTHER PUBLICATIONS

Extended European Search Report dated Nov. 8, 2023 issued corresponding European family member patent application No. 21741412.7.
(Continued)

*Primary Examiner* — Daniel C. McCracken
*Assistant Examiner* — Starfari Teshawn McClain
(74) *Attorney, Agent, or Firm* — GREENBLUM & BERNSTEIN, P.L.C.

(57) ABSTRACT

A method for producing a sulfide solid electrolyte includes: preparing a uniform solution that includes at least elemental lithium (Li), elemental tin (Sn), elemental phosphorus (P), and elemental sulfur (S) in an organic solvent; removing the organic solvent from the uniform solution to obtain a precursor; and heat-treating the precursor to obtain a sulfide solid electrolyte.

9 Claims, 2 Drawing Sheets

(52) U.S. Cl.
CPC ...... *C01P 2002/74* (2013.01); *C01P 2002/77* (2013.01); *C01P 2006/40* (2013.01); *H01M 10/0525* (2013.01); *H01M 2300/0068* (2013.01)

(58) Field of Classification Search
CPC ..... C01B 17/22; C01B 25/081; C01B 25/088; C01B 33/06; C01P 2002/72; C01P 2002/74; C01P 2002/77; C01P 2006/40; Y02E 60/10; H01B 1/10; Y02P 70/50
See application file for complete search history.

(56) References Cited

U.S. PATENT DOCUMENTS

| | | |
|---|---|---|
| 2019/0074541 A1 | 3/2019 | Kanno et al. |
| 2020/0194825 A1* | 6/2020 | Katori ................ H01B 13/00 |

FOREIGN PATENT DOCUMENTS

| | | |
|---|---|---|
| JP | 2019-169459 A | 10/2019 |
| WO | 2017/002971 A1 | 1/2017 |
| WO | 2017/155119 A1 | 9/2017 |
| WO | 2019/044517 A1 | 3/2019 |
| WO | 2019/239949 A1 | 12/2019 |

OTHER PUBLICATIONS

International Search Report and Written Opinion of the International Searching Authority issued in International Application No. PCT/JP2021/000182, dated Mar. 30, 2021, along with an English translation thereof.

Bron, P. et al., "$Li_{10}SnP_2S_{12}$: an Affordable Lithium Superionic Conductor", J. Am. Chem. Soc., Sep. 30, 2013, pp. 15694-15697.

* cited by examiner

[Figure 1]
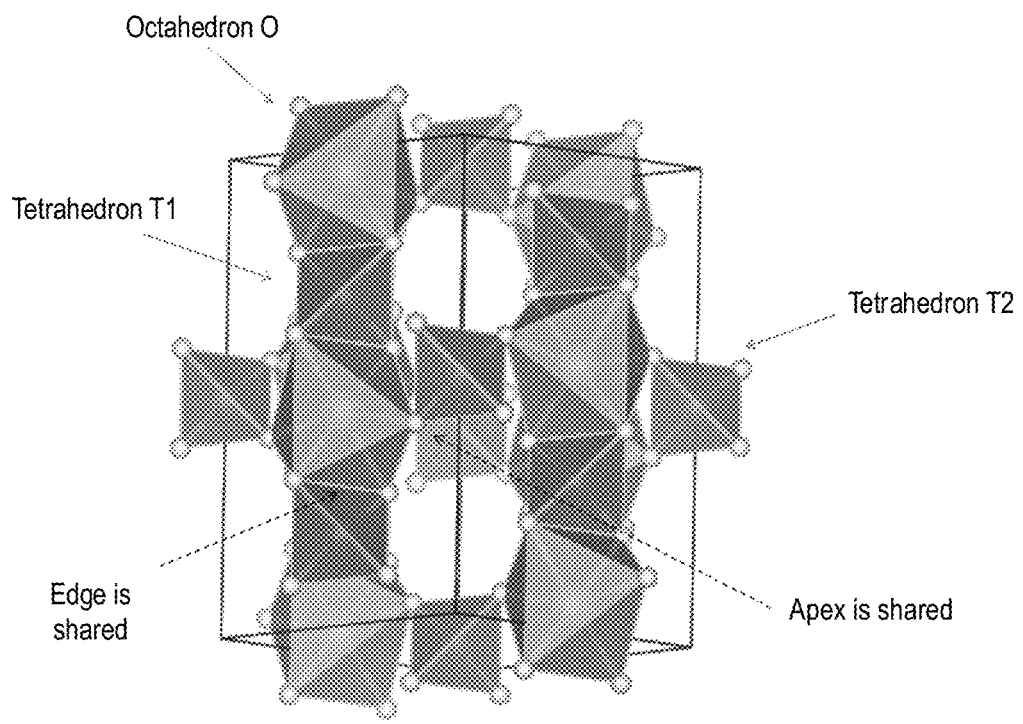
[Figure 2]
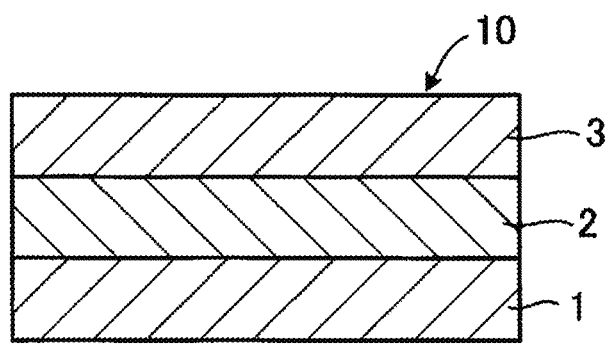

[Figure 3]
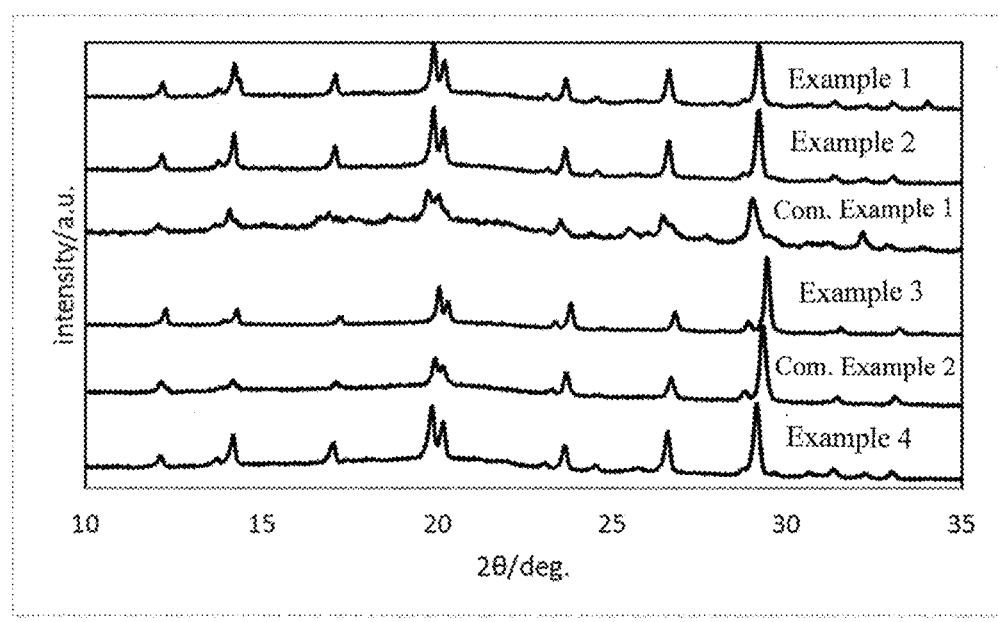

METHOD FOR PRODUCING SULFIDE SOLID ELECTROLYTE INCLUDING Sn

TECHNICAL FIELD

The present invention relates to a method for producing a sulfide-based solid electrolyte including Sn.

BACKGROUND ART

Recently, a demand for lithium ion secondary batteries has been increased in applications including portable information terminals, portable electronic equipments, electric vehicles, hybrid electric vehicles and stationary power storage systems. However, currently, a flammable organic solvent is used as an electrolytic solution in lithium ion secondary batteries, and a strong exterior is required so that an organic solvent does not leak out. Further, for example, in the case of portable personal computers, it is necessary to employ a structure against a risk at the time when an electrolytic solution leaks out. Thus, there is a limitation on structures of devices.

Moreover, the range of applications thereof has been widened to movable bodies such as vehicles and aircrafts, and a high capacity is desired for stationary lithium ion secondary batteries. Under such circumstances, importance tends to be placed on safety more than before, and efforts are concentrated on the development of an all-solid-state lithium ion secondary battery in which none of toxic substances such as organic solvents is used.

For example, use of an oxide, phosphate compound, organic polymer, sulfide or the like as a solid electrolyte in an all-solid-state lithium ion secondary battery has been examined.

Among these solid electrolytes, the sulfide has characteristics that it has high ion conductivity and is relatively soft, and that it is easy to form the interface between solids. The sulfide is stable with respect to active materials and has been developed as a practical solid electrolyte.

It has been found that, among sulfide-based solid electrolytes, an Sn-containing sulfide-based solid electrolyte provides satisfactory ion conductivity and high water resistance, and practical use thereof is highly expected (Non-Patent Document 1).

As a method for producing a solid electrolyte, a method for reacting raw materials while pulverizing them using a ball mill, a vibrating mill or the like is known. Further, recently, a method for synthesizing a solid electrolyte in a solvent has been developed (Patent Document 1). Synthesis in a solvent has excellent productivity and is expected.

For conventional Sn-containing sulfide-based solid electrolytes, $SnS_2$, which is a sulfide of Sn, is often used as a raw material. However, $SnS_2$ has poor solubility in solvents. For this reason, it is difficult to homogeneously disperse Sn in a solid electrolyte at the time of synthesis in a solvent, and there is a problem that it is difficult to obtain a solid electrolyte providing stable performance.

PRIOR ART DOCUMENTS

Patent Documents

Patent Document 1: Japanese Laid-Open Patent Publication No. 2019-169459

Non-Patent Documents

Non-Patent Document 1: J. Am. Chem. Soc. 2013, 135, 15694-15697

SUMMARY OF THE INVENTION

Problems to be Solved by the Invention

Under the above-described circumstances, it has been desired to provide a method for producing a sulfide-based solid electrolyte with little impurities providing stable performance, which has excellent productivity.

Means for Solving the Problems

The present inventors diligently made researches in consideration of the above-described problems and obtained an unexpected finding that a sulfide-based solid electrolyte with little impurities that is stable can be produced by preparing and using, as a raw material, an Li—Sn—S homogeneous solution which contains at least elemental lithium (Li), elemental tin (Sn) and elemental sulfur (S) in an organic solvent.

Specifically, the present invention is as described below.

<1> A method for producing a sulfide-based solid electrolyte which comprises:

a solution making step for preparing a homogeneous solution that includes at least elemental lithium (Li), elemental tin (Sn), elemental phosphorus (P) and elemental sulfur (S) in an organic solvent;

a drying step for removing the organic solvent from the homogeneous solution to obtain a precursor; and a heat treatment step for heat-treating the precursor to obtain a sulfide-based solid electrolyte.

<2> The method according to item <1>, wherein the solution making step comprises:

a solution making step 1 for mixing $Li_2S$ and $P_2S_5$ with each other in the organic solvent to prepare an Li—P—S homogeneous solution;

a solution making step 2 for preparing an Li—Sn—S homogeneous solution that includes at least elemental lithium (Li), elemental tin (Sn) and elemental sulfur (S) in the organic solvent, and mixing the Li—P—S homogeneous solution and the Li—Sn—S homogeneous solution with each other to prepare the homogeneous solution.

<3> The method according to item <1>, wherein the solution making step comprises:

a solution making step 1 for mixing $Li_2S$ and $P_2S_5$ with each other in the organic solvent to prepare an Li—P—S homogeneous solution;

a solution making step 2 for preparing an Li—Sn—S homogeneous solution that includes at least elemental lithium (Li), elemental tin (Sn) and elemental sulfur (S) in the organic solvent;

a solution making step 3 for mixing $Li_2S$ and S with each other in the organic solvent to prepare an Li—S homogeneous solution, and mixing the Li—P—S homogeneous solution, the Li—Sn—S homogeneous solution and the Li—S homogeneous solution with each other to prepare the homogeneous solution.

<4> The method according to item <1>, wherein the solution making step comprises:

a solution making step 1 for mixing $Li_2S$ and $P_2S_5$ with each other in the organic solvent to prepare an Li—P—S homogeneous solution;

a solution making step 2 for preparing an Li—Sn—S homogeneous solution that includes at least elemental lithium (Li), elemental tin (Sn) and elemental sulfur (S) in the organic solvent;

a solution making step 3 for mixing $Li_2S$ and S with each other in the organic solvent to prepare an Li—S homogeneous solution;

a solution making step 4 for preparing an Li—Si—S homogeneous solution that includes at least elemental lithium (Li), elemental silicon (Si) and elemental sulfur (S) in the organic solvent, and mixing the Li—P—S homogeneous solution, the Li—Sn—S homogeneous solution, the Li—S homogeneous solution and the Li—Si—S homogeneous solution with each other to prepare the homogeneous solution.

<5> The method according to any one of items <2> to <4>, wherein the solution making step 2 comprises mixing $Li_2S$, SnS and S with each other in the organic solvent to prepare the Li—Sn—S homogeneous solution.

<6> The method according to item <4>, wherein the solution making step 4 comprises mixing $Li_2S$, $SiS_2$ and S with each other in the organic solvent to prepare the Li—Si—S homogeneous solution.

<7> A method for producing a sulfide-based solid electrolyte which comprises:

a slurry forming step 1 for preparing an $Li_3PS_4$-containing slurry;

a solution making step for preparing an Li—Sn—S homogeneous solution that includes at least elemental lithium (Li), elemental tin (Sn) and elemental sulfur (S) in an organic solvent;

a slurry forming step 2 for mixing the $Li_3PS_4$-containing slurry and the Li—Sn—S homogeneous solution with each other to prepare a mixed slurry;

a drying step for removing the organic solvent from the mixed slurry to obtain a precursor; and a heat treatment step for heat-treating the precursor to obtain a sulfide-based solid electrolyte.

<8> The method according to item <7>, wherein the solution making step comprises adding $Li_2S$, SnS and S to the organic solvent to be mixed therewith to prepare the Li—Sn—S homogeneous solution.

<9> The method according to any one of items <1> to <8>, wherein the organic solvent is at least one selected from the group consisting of an ether-based solvent, a nitrile-based solvent and an ester-based solvent.

<10> The method according to any one of items <1> to <9>, wherein the organic solvent is at least one selected from the group consisting of tetrahydrofuran, acetonitrile, ethyl acetate and methyl acetate.

<11> The method according to any one of items <1> to <10>, wherein the temperature in the drying step is 60 to 280° C.

<12> The method according to any one of items <1> to <11>, wherein the temperature in the heat treatment step is 200° C. to 700° C.

<13> The method according to any one of items <1> to <12>, wherein the sulfide-based solid electrolyte contains an LGPS-based solid electrolyte and has peaks at at least $2\theta=19.90°\pm0.50°$, $20.20°\pm0.50°$, $26.70°\pm0.50°$ and $29.20°\pm0.50°$ in X-ray diffraction (CuKα: λ=1.5405 Å).

Advantageous Effect of the Invention

According to the present invention, it is possible to provide a method for producing a sulfide-based solid electrolyte with little impurities providing stable performance, which has excellent productivity. In particular, in the case where synthesis is carried out using an Li—Sn—S homogeneous solution, it is possible to produce a sulfide-based solid electrolyte providing higher ion conductivity when compared to the case where $SnS_2$ that is an insoluble raw material is used. Further, according to the present invention, it is possible to provide a formed body obtained by heating and forming the sulfide-based solid electrolyte and an all-solid-state battery comprising the sulfide-based solid electrolyte. Moreover, this production method can be applied to mass production.

BRIEF DESCRIPTION OF THE DRAWINGS

FIG. 1 is a schematic view showing a crystal structure of a sulfide-based solid electrolyte according to one embodiment of the present invention.

FIG. 2 is a schematic cross sectional view of an all-solid-state battery according to one embodiment of the present invention.

FIG. 3 is a graph showing the results of the X-ray diffraction measurement of the sulfide-based solid electrolytes obtained in Examples 1-4 and Comparative Examples 1-2.

EMBODIMENTS FOR CARRYING OUT THE INVENTION

Hereinafter, the present invention will be described in detail. Note that materials, constitutions, etc. described below do not limit the present invention and can be modified variously within the range of the gist of the present invention.

The first embodiment of the present invention is a method for producing a sulfide-based solid electrolyte, the method including:

a solution making step for preparing a homogeneous solution that includes at least elemental lithium (Li), elemental tin (Sn), elemental phosphorus (P) and elemental sulfur (S) in an organic solvent;

a drying step for removing the organic solvent from the homogeneous solution to obtain a precursor; and a heat treatment step for heat-treating the precursor to obtain a sulfide-based solid electrolyte.

In the present invention, a homogeneous solution that includes at least elemental lithium (Li), elemental tin (Sn), elemental phosphorus (P) and elemental sulfur (S) in an organic solvent is defined as a solution which includes at least elemental lithium (Li), elemental tin (Sn), elemental phosphorus (P) and elemental sulfur (S) in an organic solvent, wherein no undissolved substance is precipitated.

In the first embodiment of the present invention, it is preferred that the solution making step includes: a solution making step 1 for mixing $Li_2S$ and $P_2S_5$ with each other in the organic solvent to prepare an Li—P—S homogeneous solution; and a solution making step 2 for preparing an Li—Sn—S homogeneous solution that includes at least elemental lithium (Li), elemental tin (Sn) and elemental sulfur (S) in the organic solvent, and that the method includes mixing the Li—P—S homogeneous solution and the Li—Sn—S homogeneous solution with each other to prepare a homogeneous solution.

Moreover, in the first embodiment of the present invention, it is also preferred that the solution making step includes, in addition to the solution making steps 1 and 2, a solution making step 3 for mixing $Li_2S$ and S with each other in the organic solvent to prepare an Li—S homogeneous solution, and that the method includes mixing the Li—P—S homogeneous solution, the Li—Sn—S homogeneous solution and the Li—S homogeneous solution with each other to prepare a homogeneous solution.

Furthermore, in the first embodiment of the present invention, it is also preferred that the solution making step includes, in addition to the solution making steps 1-3, a solution making step 4 for preparing an Li—Si—S homogeneous solution that includes at least elemental lithium (Li), elemental silicon (Si) and elemental sulfur (S) in the organic solvent, and that the method includes mixing the Li—P—S homogeneous solution, the Li—Sn—S homogeneous solution, the Li—S homogeneous solution and the Li—Si—S homogeneous solution with each other to prepare a homogeneous solution.

Hereinafter, the solution making steps 1-4, the drying step and the heat treatment step will be described in detail.

In the present invention, the "Li—P—S homogeneous solution" is defined as a solution which includes at least elemental lithium (Li), elemental phosphorus (P) and elemental sulfur (S) in an organic solvent, wherein no undissolved substance is precipitated. Similarly, the "Li—Sn—S homogeneous solution" is defined as a solution which includes at least elemental lithium (Li), elemental tin (Sn) and elemental sulfur (S) in an organic solvent, wherein no undissolved substance is precipitated. The "Li—S homogeneous solution" is defined as a solution which includes at least elemental lithium (Li) and elemental sulfur (S) in an organic solvent, wherein no undissolved substance is precipitated. Further, the "Li—Si—S homogeneous solution" is defined as a solution which includes at least elemental lithium (Li), elemental silicon (Si) and elemental sulfur (S) in an organic solvent, wherein no undissolved substance is precipitated.

<Solution Making Step 1>

The solution making step 1 is a step in which $Li_2S$ and $P_2S_5$ are mixed with each other in an organic solvent to prepare an Li—P—S homogeneous solution. Preferably, $Li_2S$ and $P_2S_5$ are mixed with each other in an organic solvent so that the $Li_2S/P_2S_5$ molar ratio becomes from 0.7 to 1.5 to prepare an Li—P—S homogeneous solution.

At the time of mixing in the solution making step 1, a substrate is dispersed to provide a slurry state, but soon a reaction occurs. There is no need to carry out special stirring operation for crushing particles, and it is sufficient when stirring power that can enable suspension and dispersion of the slurry is provided.

Regarding the reaction temperature in the solution making step 1, the reaction slowly proceeds even at room temperature, but heating can be performed for increasing the reaction rate. When heating is performed, it is sufficient when it is performed at a temperature that is the boiling point of the organic solvent or lower. The temperature varies depending on the organic solvent to be used, but is usually lower than 120° C. Heating can also be performed under the pressurized state using an autoclave or the like. However, when mixing is carried out at a high temperature (120° C. or higher), there is concern that a side reaction may proceed.

The reaction time in the solution making step 1 varies depending on the type of the organic solvent and the particle diameter and concentration of raw materials, but for example, by performing the reaction for 0.1 to 24 hours, the reaction is completed and a solution can be made.

The Li—P—S homogeneous solution is preferably produced by mixing $Li_2S$ and $P_2S_5$ with each other in the organic solvent so that the $Li_2S/P_2S_5$ molar ratio becomes from 0.7 to 1.5 to cause a reaction, and the $Li_2S/P_2S_5$ molar ratio is more preferably from 0.75 to 1.4, and particularly preferably from 0.8 to 1.35. When the $Li_2S/P_2S_5$ molar ratio is 0.7 to 1.5, a solution can be made from $Li_2S$ and $P_2S_5$ at room temperature. When the molar ratio is not within the above-described range, precipitation may occur.

This solution may contain unreacted $Li_2S$ and $P_2S_5$. Further, the solution may contain impurities derived from $Li_2S$ and $P_2S_5$. The impurities are scarcely dissolved in the solvent and most of them precipitate. For this reason, it is preferred to apply filtration or centrifugation to the obtained solution to remove the precipitate and separate the solution, thereby obtaining a high-purity Li—P—S homogeneous solution.

As $Li_2S$, a synthesized product or commercially-available product can be used. The lower the content of moisture is, the better it is because mixing of moisture deteriorates the other raw materials and the precursor. The content is more preferably 300 ppm or less, and particularly preferably 50 ppm or less. The smaller the particle diameter of $Li_2S$ is, the better it is because a higher reaction rate is obtained. The particle diameter is preferably 10 nm to 100 μm, more preferably 100 nm to 30 μm, and particularly preferably 300 nm to 10 μm. The particle diameter can be measured by means of SEM, a particle size distribution measurement apparatus utilizing laser scattering, or the like. As $Li_2S$ to be used in the solution making steps 2-4 which will be described later, the same material as above can be preferably used.

As $P_2S_5$, a synthesized product or commercially-available product can be used. The higher the purity of $P_2S_5$ is, the better it is because the amount of impurities mixed into the solid electrolyte becomes smaller. The smaller the particle diameter of $P_2S_5$ is, the better it is because a higher reaction rate is obtained. The particle diameter is preferably 10 nm to 100 μm, more preferably 100 nm to 30 μm, and particularly preferably 300 nm to 10 μm. The lower the content of moisture is, the better it is because mixing of moisture deteriorates the other raw materials and the precursor. The content is more preferably 300 ppm or less, and particularly preferably 50 ppm or less.

The organic solvent is not particularly limited as long as it does not react with $Li_2S$ or $P_2S_5$. Examples thereof include an ether-based solvent, an ester-based solvent, a hydrocarbon-based solvent and a nitrile-based solvent. Specific examples thereof include tetrahydrofuran, cyclopentyl methyl ether, diisopropyl ether, diethyl ether, dimethyl ether, dioxane, methyl acetate, ethyl acetate, butyl acetate and acetonitrile. Among them, at least one selected from the group consisting of tetrahydrofuran, acetonitrile, ethyl acetate and methyl acetate is preferred, and acetonitrile is particularly preferred. Since acetonitrile does not contain any oxygen atom in the structure thereof, oxygen is less likely to be introduced into the raw material composition, and change in quality is suppressed. Further, for preventing deterioration of the raw material composition, it is preferred to remove oxygen and water in the organic solvent in advance. In particular, regarding the moisture content, it is preferably 100 ppm or less, and more preferably 50 ppm or less. As the organic solvents to be used in the solution making steps 2-4 which will be described later, the same materials as above can be preferably used.

<Solution Making Step 2>

The solution making step 2 is a step of preparing an Li—Sn—S homogeneous solution that includes at least elemental lithium (Li), elemental tin (Sn) and elemental sulfur (S) in the organic solvent. Preferably, in the solution making step 2, $Li_2S$, SnS and S (elemental sulfur) are mixed with each other in the organic solvent to prepare an Li—Sn—S homogeneous solution.

For conventional sulfide-based solid electrolytes containing Sn, $SnS_2$ that is a sulfide of Sn is often used as a raw material. However, $SnS_2$ has poor solubility in solvents. For this reason, it is difficult to homogeneously disperse Sn in a solid electrolyte at the time of synthesis in a solvent, and there is a problem that it is difficult to obtain a solid electrolyte providing stable performance. The present inventors found that, by using the combination of $Li_2S$, SnS and S, an Li—Sn—S homogeneous solution in which these materials are dissolved in an organic solvent can be prepared.

In the solution making step 2, more preferably, $Li_2S$, SnS and S are mixed with each other in an organic solvent so that the molar ratio of $Li_2S$:SnS:S becomes 2:1:12 to 6:1:36, and particularly preferably 3:1:18 to 5:1:30 to prepare an Li—Sn—S homogeneous solution.

At the time of mixing in the solution making step 2, a substrate is dispersed to provide a slurry state, but soon a reaction occurs. There is no need to carry out special stirring operation for crushing particles, and it is sufficient when stirring power that can enable suspension and dispersion of the slurry is provided.

Regarding the reaction temperature in the solution making step 2, it is sufficient when it is performed at a temperature that is the boiling point of the organic solvent or lower. The temperature varies depending on the organic solvent to be used, but is usually lower than 120° C. The reaction temperature is preferably 50 to 100° C., and more preferably 60 to 90° C. Heating can also be performed under the pressurized state using an autoclave or the like. However, when mixing is carried out at a high temperature (120° C. or higher), there is concern that a side reaction may proceed.

The reaction time in the solution making step 2 varies depending on the type of the organic solvent and the particle diameter and concentration of raw materials, but for example, by performing the reaction for 0.1 to 24 hours, the reaction is completed and a solution can be made.

This solution may contain unreacted $Li_2S$, SnS and S. Further, the solution may contain impurities derived from $Li_2S$, SnS and S. The impurities are scarcely dissolved in the solvent and most of them precipitate. For this reason, it is preferred to apply filtration or centrifugation to the obtained solution to remove the precipitate and separate the solution, thereby obtaining a high-purity Li—Sn—S homogeneous solution.

The concentration of each element in the obtained homogeneous solution is analyzed by means of ICP. The molar ratio of Li:Sn:S is preferably 4:1:15 to 12:1:43, more preferably 5:1:18 to 11:1:40, and particularly preferably 6:1:22 to 10:1:36.

As SnS, a synthesized product or commercially-available product can be used. The higher the purity of SnS is, the better it is because the amount of impurities mixed into the solid electrolyte becomes smaller. The smaller the particle diameter of SnS is, the better it is because a higher reaction rate is obtained. The particle diameter is preferably 10 nm to 100 µm, more preferably 100 nm to 30 µm, and particularly preferably 300 nm to 10 µm. The particle diameter can be measured by means of SEM, a particle size distribution measurement apparatus utilizing laser scattering, or the like. Note that there is no problem even when a part of the above-described raw materials to be used are amorphous. The lower the content of moisture is, the better it is because mixing of moisture deteriorates the other raw materials and the precursor. The content is more preferably 300 ppm or less, and particularly preferably 50 ppm or less.

As elemental sulfur, a synthesized product or commercially-available product can be used, but in general, cyclic S8 sulfur is used. The lower the content of moisture is, the better it is because mixing of moisture deteriorates the other raw materials and the precursor. The content is more preferably 300 ppm or less, and particularly preferably 50 ppm or less. The smaller the particle diameter of elemental sulfur is, the better it is because a higher reaction rate is obtained. The particle diameter is preferably 10 nm to 100 µm, more preferably 100 nm to 30 µm, and particularly preferably 300 nm to 10 µm. As S (elemental sulfur) to be used in the solution making steps 3 and 4 which will be described later, the same material as above can be preferably used.

<Solution Making Step 3>

The solution making step 3 is a step in which $Li_2S$ and S (elemental sulfur) are mixed with each other in an organic solvent to prepare an Li—S homogeneous solution.

In the solution making step 3, $Li_2S$ and S are mixed with each other in an organic solvent so that the molar ratio of $Li_2S$:S becomes preferably 1:4 to 1:10, and more preferably 1:5 to 1:8 to prepare an Li—S homogeneous solution.

At the time of mixing in the solution making step 3, a substrate is dispersed to provide a slurry state, but soon a reaction occurs. There is no need to carry out special stirring operation for crushing particles, and it is sufficient when stirring power that can enable suspension and dispersion of the slurry is provided.

Regarding the reaction temperature in the solution making step 3, it is sufficient when it is performed at a temperature that is the boiling point of the organic solvent or lower. The temperature varies depending on the organic solvent to be used, but is usually lower than 120° C. The reaction temperature is preferably 50 to 100° C., and more preferably 60 to 90° C. Heating can also be performed under the pressurized state using an autoclave or the like. However, when mixing is carried out at a high temperature (120° C. or higher), there is concern that a side reaction may proceed.

The reaction time in the solution making step 3 varies depending on the type of the organic solvent and the particle diameter and concentration of raw materials, but for example, by performing the reaction for 0.1 to 24 hours, the reaction is completed and a solution can be made.

This solution may contain unreacted $Li_2S$ and S. Further, the solution may contain impurities derived from $Li_2S$ and S. The impurities are scarcely dissolved in the solvent and most of them precipitate. For this reason, it is preferred to apply filtration or centrifugation to the obtained solution to remove the precipitate and separate the solution, thereby obtaining a high-purity Li—S homogeneous solution.

<Solution Making Step 4>

The solution making step 4 is a step in which an Li—Si—S homogeneous solution, which contains at least elemental lithium (Li), elemental silicon (Si) and elemental sulfur (S) in an organic solvent, is prepared. By using the Li—Si—S homogeneous solution, a sulfide-based solid electrolyte with little impurities, which has high ion conductivity, can be stably obtained. When using $SiS_2$ as a starting material, it is difficult to homogeneously disperse Si in a solid electrolyte at the time of synthesis. Further, $SiS_2$ has high reactivity with the atmosphere and often contains an oxygen-containing compound or Si that is an unreacted raw material. For such reasons, it is difficult to prepare $SiS_2$ not containing impurities. Further, it is difficult to remove these impurities from $SiS_2$.

Meanwhile, in the case of the Li—Si—S homogeneous solution, Si is easily dispersed homogeneously in the solid electrolyte at the time of synthesis and a side reaction is not easily caused because impurities are reduced by the subsequent operation of removing the precipitate. For this reason, it is considered that a sulfide-based solid electrolyte having high ion conductivity can be stably produced by using it.

It is preferred that the Li—Si—S homogeneous solution, in which Li, Si and S are dissolved, is provided by mixing $Li_2S$, $SiS_2$ and S (elemental sulfur) with each other in an organic solvent to cause a reaction. This solution may contain unreacted $Li_2S$, $SiS_2$ and S. Further, the solution may contain impurities derived from $Li_2S$, $SiS_2$ and S.

More preferably, the solution obtained is subjected to filtration or centrifugation to remove the precipitate and separate the solution, thereby obtaining the Li—Si—S homogeneous solution. The concentration of each element in the obtained homogeneous solution is analyzed by means of ICP. The Li/Si molar ratio is preferably from 0.6 to 2.0. In this regard, the above-described molar ratio is more preferably Li/Si=0.7 to 1.6, and particularly preferably Li/Si=0.8 to 1.4.

The precipitate can be removed by means of filtration or centrifugation. When performing filtration using a filter, the pore size of the filter is desirably 10 μm or less. The pore size is more preferably 5 μm or less, and particularly preferably 2 μm or less.

The precipitate obtained includes unreacted raw materials such as $Li_2S$ and $SiS_2$ and impurities derived from $SiS_2$. Examples of the impurities include oxygen-containing compounds of Si or $SiS_2$ and $SiO_2$.

As $SiS_2$, a synthesized product or commercially-available product can be used. The higher the purity of $SiS_2$ is, the better it is because the amount of impurities mixed into the solid electrolyte becomes smaller. The smaller the particle diameter of $SiS_2$ is, the better it is because a higher reaction rate is obtained. The particle diameter is preferably 10 nm to 100 μm, more preferably 100 nm to 30 μm, and particularly preferably 300 nm to 10 μm. The particle diameter can be measured by means of SEM, a particle size distribution measurement apparatus utilizing laser scattering, or the like. Note that there is no problem even when a part of the above-described raw materials to be used are amorphous. The lower the content of moisture is, the better it is because mixing of moisture deteriorates the other raw materials and the precursor. The content is more preferably 300 ppm or less, and particularly preferably 50 ppm or less.

The total concentration of Li, Si and S in the organic solvent is preferably 0.5 to 20% by mass, more preferably 1 to 15% by mass, and particularly preferably 2 to 10% by mass. When the total concentration of Li, Si and S in the organic solvent is higher than 20% by mass, it is difficult to obtain a homogeneous solution because of precipitation of solids. Meanwhile, when the total concentration of Li, Si and S in the organic solvent is lower than 0.5% by mass, a large amount of the organic solvent must be used and a load of solvent recovery is increased. In addition, it causes excessive increase in the size of a reactor.

<Preparation of Homogeneous Mixed Solution>

In the first embodiment of the present invention, it is preferred to prepare a homogeneous mixed solution by (i) mixing the Li—P—S homogeneous solution obtained in the solution making step 1 and the Li—Sn—S homogeneous solution obtained in the solution making step 2 with each other, or (ii) mixing the Li—P—S homogeneous solution obtained in the solution making step 1, the Li—Sn—S homogeneous solution obtained in the solution making step 2 and the Li—S homogeneous solution obtained in the solution making step 3 with each other, or (iii) mixing the Li—P—S homogeneous solution obtained in the solution making step 1, the Li—Sn—S homogeneous solution obtained in the solution making step 2, the Li—S homogeneous solution obtained in the solution making step 3 and the Li—Si—S homogeneous solution obtained in the solution making step 4 with each other.

Regarding the concentration of elements constituting the homogeneous mixed solution obtained by (i) above, the molar ratio of Li:Sn:P is preferably 8:1:1 to 15:1:4, and more preferably 10:1:2 to 13:1:3.

Regarding the concentration of elements constituting the homogeneous mixed solution obtained by (ii) above, the molar ratio of Li:Sn:P is preferably 8:1:1 to 15:1:4, and more preferably 10:1:2 to 13:1:3.

Further, regarding the concentration of elements constituting the homogeneous mixed solution obtained by (iii) above, the molar ratio of Li:Sn:Si:P is preferably 32:1:2:4 to 44:1:6:8, and more preferably 35:1:3:5 to 41:1:5:7.

The type and concentration of elements can be confirmed, for example, by using an ICP emission spectrometer. Since performances of the sulfide-based solid electrolyte significantly change due to slight deviation of the composition, it is preferred that the elemental composition is accurately controlled by subjecting the homogeneous solution to ICP emission spectrometry.

Note that a halogen compound can be added thereto. In this case, it is preferred that the halogen compound is also dissolved in the organic solvent. Preferred specific examples of the halogen compound include LiCl, LiBr, LiI, $PCl_5$, $PCl_3$, $PBr_5$ and $PBr_3$, and more preferred are LiCl, LiBr and LiI. These materials may be used solely, or two or more of them may be used in combination.

<Drying Step>

The drying step is a step in which the obtained homogeneous solution is dried to remove the organic solvent, thereby obtaining a precursor. Drying is preferably carried out by means of heated-air drying or vacuum drying under inert gas atmosphere.

The drying temperature is preferably 60 to 280° C., and more preferably 100 to 250° C. The optimum temperature range slightly varies depending on the type of the organic solvent, but the temperature range is important. When the drying temperature is set to be too high in a state where the organic solvent exists, the quality of the precursor changes in almost all cases. Further, when the drying temperature is too low, the amount of the residual solvent is larger, and when the next heat treatment step is directly carried out, the organic solvent is carbonized and a sulfide-based solid electrolyte obtained has high electron conductivity. It may be preferred that the solid electrolyte has electron conductivity depending on the method for using it, but the solid electrolyte to be used for the portion 2 in FIG. 2 is required to have sufficiently low electron conductivity. In the case of using the solid electrolyte for such applications, the amount of the residual solvent must be decreased as much as possible.

The drying time slightly varies depending on the type of the organic solvent and the drying temperature, but the organic solvent can be sufficiently removed by drying for 1 to 24 hours. Note that by removing the organic solvent under reduced pressure as in the case of vacuum drying, and by flowing an inert gas such as nitrogen and argon in which the moisture content is sufficiently low, the temperature at the time of removing the organic solvent can be lowered and the required time can be shortened.

Note that the heat treatment step described below and the drying step can be carried out simultaneously.

<Heat Treatment Step>

The heat treatment step is a step in which the precursor obtained in the drying step is heated to obtain a sulfide-based solid electrolyte.

Usually, the heating temperature is preferably 200 to 700° C., more preferably 350 to 650° C., and particularly preferably 400 to 600° C. When the temperature is lower than the above-described range, desired crystals are not easily generated, and when the temperature is higher than the above-described range, crystals other than those desired may be generated.

The heating time slightly varies depending on the heating temperature, but usually, crystallization can be sufficiently performed when the heating time is 0.1 to 24 hours. It is not preferred that heating is carried out at a high temperature for a long period of time which exceeds the above-described range because there is concern for change in quality of the sulfide-based solid electrolyte.

Heating can be performed under vacuum or inert gas atmosphere, but preferably performed under inert gas atmosphere. As the inert gas, nitrogen, helium, argon or the like can be used, and among them, argon is preferred. The contents of oxygen and moisture are preferably low, and conditions thereof are the same as those at the time of mixing in the slurry forming step.

The second embodiment of the present invention is a method for producing a sulfide-based solid electrolyte, the method including:

a slurry forming step 1 for preparing an $Li_3PS_4$-containing slurry;

a solution making step for preparing an Li—Sn—S homogeneous solution that includes at least elemental lithium (Li), elemental tin (Sn) and elemental sulfur (S) in an organic solvent;

a slurry forming step 2 for mixing the $Li_3PS_4$-containing slurry and the Li—Sn—S homogeneous solution with each other to prepare a mixed slurry;

a drying step for removing the organic solvent from the mixed slurry to obtain a precursor; and a heat treatment step for heat-treating the precursor to obtain a sulfide-based solid electrolyte.

The slurry forming step 1 in the second embodiment is not particularly limited as long as the $Li_3PS_4$-containing slurry can be prepared thereby, but it is preferred to mix $Li_2S$ and $P_2S_5$ with each other in an organic solvent so that the $Li_2S/P_2S_5$ molar ratio becomes from 2 to 4, thereby preparing the $Li_3PS_4$-containing slurry.

The other steps in the second embodiment can be carried out according to the steps explained with respect to the first embodiment.

The LGPS type crystal structure has an octahedron O composed of elemental Li and elemental S, a tetrahedron T1 composed of at least one element selected from the group consisting of P, Ge, Si and Sn and elemental S, and a tetrahedron T2 composed of elemental P and elemental S ($PS_4^{3-}$ anion), wherein the tetrahedron T1 and the octahedron O share an edge and the tetrahedron T2 and the octahedron O share an apex. A solid electrolyte having the LGPS type crystal structure is more preferred because ion conductivity thereof is particularly high. When an LGPS-based solid electrolyte containing Si is brought into contact with water, hydrogen sulfide tends to be generated. Meanwhile, when Sn is brought into contact with water, hydrogen sulfide is not generated, and it has the advantage that high safety is provided and the production can be easily carried out.

The solid electrolyte having the LGPS type crystal structure that is a preferred embodiment of the present invention preferably has peaks at at least $2\theta=19.90°\pm0.50°$, $20.20°\pm0.50°$, $26.70°\pm0.50°$ and $29.20°\pm0.50°$ in X-ray diffraction (CuKα: λ=1.5405 Å).

The sulfide-based solid electrolyte of the present invention obtained in the above-described manner can be formed into a desired formed body by various means and can be used for various applications including an all-solid-state battery described below. The forming method is not particularly limited. For example, a method similar to the method for forming respective layers constituting the all-solid-state battery described in <All-solid-state battery> below can be used.

<All-Solid-State Battery>

The sulfide-based solid electrolyte of the present invention can be used, for example, as a solid electrolyte for all-solid-state batteries. Further, according to another embodiment of the present invention, an all-solid-state battery comprising the above-described solid electrolyte for all-solid-state batteries is provided.

In this regard, the "all-solid-state battery" is an all-solid-state lithium ion secondary battery. FIG. 2 is a schematic cross sectional view of an all-solid-state battery according to one embodiment of the present invention. An all-solid-state battery 10 has a structure in which a solid electrolyte layer 2 is arranged between a positive electrode layer 1 and a negative electrode layer 3. The all-solid-state battery 10 can be used in various devices including mobile phones, personal computers and automobiles.

The sulfide-based solid electrolyte of the present invention may be contained as a solid electrolyte in at least one of the positive electrode layer 1, the negative electrode layer 3 and the solid electrolyte layer 2. In the case where the sulfide-based solid electrolyte of the present invention is contained in the positive electrode layer 1 or negative electrode layer 3, the sulfide-based solid electrolyte of the present invention is used in combination with a publicly-known positive electrode active material or negative electrode active material for lithium ion secondary batteries. The quantitative ratio of the sulfide-based solid electrolyte of the present invention to be contained in the positive electrode layer 1 or negative electrode layer 3 is not particularly limited.

The sulfide-based solid electrolyte of the present invention may be used solely, or according to need, may be suitably used in combination with an oxide solid electrolyte (e.g., $Li_7La_3Zr_2O_{12}$), a sulfide-based solid electrolyte (e.g., $Li_2S$—$P_2S_5$), other complex hydride solid electrolytes (e.g., $LiBH_4$ and $3LiBH_4$—LiI), etc.

The all-solid-state battery is prepared by forming and layering the above-described layers, and the forming method and layering method for the respective layers are not particularly limited.

Examples thereof include: a method in which a solid electrolyte and/or an electrode active material are dispersed in a solvent to provide a slurry-like mixture, which is applied by a doctor blade, spin coating or the like and subjected to rolling to form a film; a gas phase method in which film forming and layering are performed by using a vacuum deposition method, ion plating method, sputtering method, laser ablation method or the like; and a pressing method in which powder is formed by hot pressing or cold pressing (not heating) and layering is performed.

Since the sulfide-based solid electrolyte of the present invention is relatively soft, it is particularly preferred to prepare the all-solid-state battery by forming the respective layers by means of the pressing method and layering the layers. As the pressing method, there are hot pressing in which heating is performed and cold pressing in which heating is not performed, but forming the layers can be sufficiently carried out even by means of cold pressing.

Note that the present invention includes a formed body obtained by heating and forming the sulfide-based solid electrolyte of the present invention. The formed body is suitably used as the all-solid-state battery. Further, the present invention includes a method for producing an all-solid-state battery, which includes a step of heating and forming the sulfide-based solid electrolyte of the present invention.

EXAMPLES

Hereinafter, the embodiments of the present invention will be more specifically described by way of examples, but the embodiments are not limited to the examples.

Example 1

<Solution Making Step 1>

In a glovebox under argon atmosphere, 101 mg of $Li_2S$ (manufactured by Sigma-Aldrich, purity: 99.8%) and 487 mg of $P_2S_5$ (manufactured by Sigma-Aldrich, purity: 99%) were weighed so that the molar ratio of $Li_2S:P_2S_5$ became 1:1. Next, to 6.0 g of acetonitrile (manufactured by Wako Pure Chemical Industries, Ltd., super dehydrated grade), $Li_2S$ and $P_2S_5$ were added in this order so that the concentration of ($Li_2S+P_2S_5$) became about 10% by mass, and mixing was carried out at room temperature for 3 hours. The mixture was gradually dissolved, and an Li—P—S homogeneous solution was obtained.

<Solution Making Step 2>

In a glovebox under argon atmosphere, 1.0 g of $Li_2S$ (manufactured by Sigma-Aldrich, purity: 99.8%), 1.0 g of SnS (manufactured by Kojundo Chemical Laboratory Co., Ltd.) and 3.7 g of S (manufactured by Kojundo Chemical Laboratory Co., Ltd.) were weighed so that the molar ratio of $Li_2S:SnS:S$ became 3:1:18. Next, 100 g of acetonitrile (manufactured by Wako Pure Chemical Industries, Ltd., super dehydrated grade) was added thereto so that the concentration of ($Li_2S+SnS+S$) became about 6% by mass, and mixing was carried out at 80° C. for 24 hours. The mixture was gradually dissolved, but at this stage, insoluble matters remained.

The obtained solution was filtered with a membrane filter (PTFE, pore size: 1.0 μm), thereby obtaining 300 mg of a filter residue and 100 g of a filtrate (Li—Sn—S homogeneous solution). When the Li—Sn—S homogeneous solution was subjected to ICP analysis, Li:Sn:S (molar ratio) was 6:1:26. Further, the concentration of Sn was 0.76% by mass.

<Solution Making Step 3>

In a glovebox under argon atmosphere, 1.0 g of $Li_2S$ (manufactured by Sigma-Aldrich, purity: 99.8%) and 3.7 g of S (manufactured by Kojundo Chemical Laboratory Co., Ltd.) were weighed so that the molar ratio of $Li_2S:S$ became 1:6. Next, 75 g of acetonitrile (manufactured by Wako Pure Chemical Industries, Ltd., super dehydrated grade) was added thereto so that the concentration of ($Li_2S+S$) became about 6% by mass, and mixing was carried out at 80° C. for 24 hours. The mixture was gradually dissolved, but at this stage, insoluble matters remained.

The obtained solution was filtered with a membrane filter (PTFE, pore size: 1.0 μm), thereby obtaining 200 mg of a filter residue and 75 g of a filtrate (Li—S homogeneous solution). When the Li—S homogeneous solution was subjected to ICP analysis, Li:S (molar ratio) was 1:3. Further, the concentration of Li was 0.5% by mass.

<Preparation of Homogeneous Mixed Solution>

6.6 g of the prepared Li—P—S homogeneous solution, 25.08 g of the prepared Li—Sn—S homogeneous solution and 7.97 g of the prepared Li—S homogeneous solution were mixed with each other so that the molar ratio of Li:Sn:P became 12:1:3, and stirring was carried out for 3 hours to prepare a homogeneous mixed solution.

<Drying Step>

The obtained homogeneous mixed solution was dried under vacuum at 180° C. for 4 hours to remove the solvent. Removal of the solvent was carried out while stirring the solution. After that, it was cooled to room temperature to obtain a precursor.

<Heat Treatment Step>

In the glovebox, the obtained precursor was put into a glass reaction tube, which was placed in an electric tube furnace in a manner such that the precursor was not exposed to atmosphere. Argon (G3 grade) was injected into the reaction tube, the temperature was increased to 550° C. over 3 hours, and then burning was carried out at 550° C. for 8 hours, thereby synthesizing $Li_{9.81}Sn_{0.81}P_{2.19}S_{12}$ crystal.

Example 2

<Solution Making Step 1>

An Li—P—S homogeneous solution was obtained in a manner similar to that in Example 1.

<Solution Making Step 2>

In a glovebox under argon atmosphere, 1.25 g of $Li_2S$ (manufactured by Sigma-Aldrich, purity: 99.8%), 1 g of SnS (manufactured by Kojundo Chemical Laboratory Co., Ltd.) and 5 g of S (manufactured by Kojundo Chemical Laboratory Co., Ltd.) were weighed so that the molar ratio of $Li_2S:SnS:S$ became 4.5:1:24. Next, 100 g of acetonitrile (manufactured by Wako Pure Chemical Industries, Ltd., super dehydrated grade) was added thereto so that the concentration of ($Li_2S+SnS+S$) became about 7% by mass, and mixing was carried out at 80° C. for 24 hours. The mixture was gradually dissolved, but at this stage, insoluble matters remained.

The obtained solution was filtered with a membrane filter (PTFE, pore size: 1.0 μm), thereby obtaining 300 mg of a filter residue and 100 g of a filtrate (Li—Sn—S homogeneous solution). When the Li—Sn—S homogeneous solution was subjected to ICP analysis, Li:Sn:S (molar ratio) was 9:1:30. Further, the concentration of Sn was 0.89% by mass.

<Preparation of Homogeneous Mixed Solution>

6.6 g of the prepared Li—P—S homogeneous solution and 33.28 g of the prepared Li—Sn—S homogeneous solution were mixed with each other so that the molar ratio of Li:Sn:P became 12:1:3, and stirring was carried out for 3 hours to prepare a homogeneous mixed solution.

<Drying Step>

A precursor was obtained in a manner similar to that in Example 1.

<Heat Treatment Step>

$Li_{9.81}Sn_{0.81}P_{2.19}S_{12}$ crystal was synthesized in a manner similar to that in Example 1.

Comparative Example 1

<Solution Making Step>

An Li—P—S homogeneous solution was obtained in a manner similar to that in Example 1.

<Slurry Forming Step>

6.6 g of the prepared Li—P—S homogeneous solution, 296 mg of $SnS_2$ powder (manufactured by Kojundo Chemical Laboratory Co., Ltd.) and 350 mg of $Li_2S$ were mixed with each other so that the molar ratio of Li:Sn:P became 12:1:3, and stirring was carried out for 3 hours to prepare a slurry. In this regard, Sn was not in a state where it was completely dissolved in the organic solvent.

<Drying Step>

The obtained slurry was dried under vacuum at 180° C. for 4 hours to remove the solvent. Removal of the solvent was carried out while stirring the slurry. After that, it was cooled to room temperature to obtain a precursor.

<Heat Treatment Step>

$Li_{9.81}Sn_{0.81}P_{2.19}S_{12}$ crystal was synthesized in a manner similar to that in Example 1.

Example 3

<Solution Making Step 1>

An Li—P—S homogeneous solution was obtained in a manner similar to that in Example 1.

<Solution Making Step 2>

An Li—Sn—S homogeneous solution was obtained in a manner similar to that in Example 1.

<Solution Making Step 3>

An Li—S homogeneous solution was obtained in a manner similar to that in Example 1.

<Solution Making Step 4>

In a glovebox under argon atmosphere, 4.0 g of $Li_2S$ (manufactured by Sigma-Aldrich, purity: 99.8%), 16.0 g of $SiS_2$ (manufactured by HANGZHOU) and 2.4 g of S (manufactured by Kojundo Chemical Laboratory Co., Ltd.) were weighed so that the molar ratio of $Li_2S:SiS_2:S$ became 0.5:1:0.4. Next, 610 g of acetonitrile (manufactured by Wako Pure Chemical Industries, Ltd., super dehydrated grade) was added thereto so that the concentration of ($Li_2S+SiS_2+S$) became about 3.5% by mass, and mixing was carried out at room temperature for 24 hours. The mixture was gradually dissolved, but at this stage, impurities in the raw materials remained.

The obtained solution was filtered with a membrane filter (PTFE, pore size: 1.0 μm), thereby obtaining 2.0 g of a filter residue and 578 g of a filtrate (Li—Si—S homogeneous solution). When the Li—Si—S homogeneous solution was subjected to ICP analysis, Li:Si:S (molar ratio) was 1:1:3. Further, the concentration of ($Li_2S+SiS_2+S$) was 3.43% by mass.

<Preparation of Homogeneous Mixed Solution>

6.6 g of the prepared Li—P—S homogeneous solution, 11.11 g of the prepared Li—Sn—S homogeneous solution, 13.48 g of the prepared Li—Si—S homogeneous solution and 22.93 g of the prepared Li—S homogeneous solution were mixed with each other so that the molar ratio of Li:Sn:Si:P became 38:1:4:6, and stirring was carried out for 3 hours to prepare a homogeneous mixed solution.

<Drying Step>

The obtained homogeneous mixed solution was dried under vacuum at 180° C. for 4 hours to remove the solvent. Removal of the solvent was carried out while stirring the solution. After that, it was cooled to room temperature to obtain a precursor.

<Heat Treatment Step>

In the glovebox, the obtained precursor was put into a glass reaction tube, which was placed in an electric tube furnace in a manner such that the precursor was not exposed to atmosphere. Argon (G3 grade) was injected into the reaction tube, the temperature was increased to 550° C. over 3 hours, and then burning was carried out at 550° C. for 8 hours, thereby synthesizing $Li_{10.35}Sn_{0.27}Si_{1.08}P_{1.65}S_{12}$ crystal.

Comparative Example 2

<Solution Making Step 1>

An Li—P—S homogeneous solution was obtained in a manner similar to that in Example 1.

<Solution Making Step 2>

An Li—Si—S homogeneous solution was obtained in a manner similar to that in Example 3.

<Slurry Mixing Step>

6.6 g of the prepared Li—P—S homogeneous solution, 131 mg of $SnS_2$ powder, 13.48 g of the Li—Si—S homogeneous solution and 461 mg of $Li_2S$ were mixed with each other so that the molar ratio of Li:Sn:Si:P became 38:1:4:6, and stirring was carried out for 3 hours to prepare a slurry. In this regard, Sn was not in a state where it was completely dissolved in the organic solvent.

<Drying Step>

The obtained slurry was dried under vacuum at 180° C. for 4 hours to remove the solvent. Removal of the solvent was carried out while stirring the slurry. After that, it was cooled to room temperature to obtain a precursor.

<Heat Treatment Step>

$Li_{10.35}Sn_{0.27}Si_{1.08}P_{1.65}S_{12}$ crystal was synthesized in a manner similar to that in Example 3.

Example 4

<Slurry Forming Step 1>

In a glovebox under argon atmosphere, 236 mg of $Li_2S$ (manufactured by Sigma-Aldrich, purity: 99.8%) and 487 mg of $P_2S_5$ (manufactured by Sigma-Aldrich, purity: 99%) were weighed so that the molar ratio of $Li_2S:P_2S_5$ became 2.4:1. Next, to 7.0 g of acetonitrile (manufactured by Wako Pure Chemical Industries, Ltd., super dehydrated grade), $Li_2S$ and $P_2S_5$ were added in this order so that the concentration of ($Li_2S+P_2S_5$) became about 10% by mass, and mixing was carried out at room temperature for 12 hours. Precipitation of $Li_3PS_4$ was caused to obtain an $Li_3PS_4$-containing slurry.

<Solution Making Step>

An Li—Sn—S homogeneous solution was obtained in a manner similar to that in Example 1.

<Slurry Forming Step 2>

7.72 g of the prepared $Li_3PS_4$-containing slurry and 20.71 g of the prepared Li—Sn—S homogeneous solution were mixed with each other so that the molar ratio of Li:Sn:P became 12:1:3, and stirring was carried out for 3 hours to prepare a slurry mixed solution.

<Drying Step>

The obtained slurry mixed solution was dried under vacuum at 180° C. for 4 hours to remove the solvent. Removal of the solvent was carried out while stirring the solution. After that, it was cooled to room temperature to obtain a precursor.

<Heat Treatment Step>

$Li_{9.81}Sn_{0.81}P_{2.19}S_{12}$ crystal was synthesized in a manner similar to that in Example 1.

Specifically, the sample was put into a thermostatic bath with its temperature being set at 25° C. and it was kept for 30 minutes, and after that, the lithium ion conductivity was measured. The measurement frequency range was 0.1 Hz to 1 MHz, and the amplitude was 50 mV. The measurement results of the lithium ion conductivity are shown in Table 1 below.

TABLE 1

|  | Composition | P component | Sn component | Si component | Others | Conductivity |
|---|---|---|---|---|---|---|
| Example 1 | $Li_{9.81}Sn_{0.81}P_{2.19}S_{12}$ | Li—P—S homogeneous solution | Li—Sn—S homogeneous solution | Absent | Li—S homogeneous solution | 2.6 mS/cm |
| Example 2 |  | Li—P—S homogeneous solution | Li—Sn—S homogeneous solution | Absent | Absent | 2.8 mS/cm |
| Comparative Example 1 |  | Li—P—S homogeneous solution | $SnS_2$ powder | Absent | $Li_2S$ powder | 1.4 mS/cm |
| Example 3 | $Li_{10.35}Sn_{0.27}$-$Si_{1.08}P_{1.65}S_{12}$ | Li—P—S homogeneous solution | Li—Sn—S homogeneous solution | Li—Sn—S homogeneous solution | Li—S homogeneous solution | 4.6 mS/cm |
| Comparative Example 2 |  | Li—P—S homogeneous solution | $SnS_2$ powder | Li—Si—S homogeneous solution | $Li_2S$ powder | 3.9 mS/cm |
| Example 4 | $Li_{9.81}Sn_{0.81}P_{2.19}S_{12}$ | Li—P—S containing slurry | Li—Sn—S homogeneous solution | Absent | Absent | 2.0 mS/em |

<X-Ray Diffraction Measurement>

Powders of the sulfide-based solid electrolytes obtained in Examples 1-4 and Comparative Examples 1-2 were subjected to the X-ray diffraction measurement under Ar atmosphere at room temperature (25° C.) ("X' Pert3 Powder" manufactured by PANalytical, CuKα: λ=1.5405 Å).

The results of the X-ray diffraction measurement of the sulfide-based solid electrolytes obtained in Examples 1-4 and Comparative Examples 1-2 are shown in FIG. 3.

As shown in FIG. 3, in Examples 1-4 and Comparative Examples 1-2, the diffraction peaks were observed at at least 2θ=19.90°±0.50°, 20.20°±0.50°, 26.70°±40.50° and 29.20°±0.50°. The pattern corresponded to that of $Li_{10}GeP_2S_{12}$ of ICSD database, and it was recognized that the LGPS type crystal structure is possessed.

Further, in Comparative Example 1, many peaks of impurities were observed. It is considered that these peaks of impurities were observed since Sn was not homogeneously dispersed in the solid electrolyte at the time of synthesis because $SnS_2$ as the raw material has poor solubility in solvents.

<Lithium Ion Conductivity Measurement>

Each of the sulfide-based solid electrolytes obtained in Examples 1-4 and Comparative Examples 1-2 was subjected to uniaxial molding (420 MPa) to obtain a disk having a thickness of about 1 mm and a diameter of 10 mm. Using a cell for evaluating all-solid-state batteries (manufactured by Hohsen Corporation), the AC impedance was measured by the four-terminal method at room temperature (25° C.) ("SI1260 IMPEDANCE/GAIN-PHASE ANALYZER" manufactured by Solartron), and the lithium ion conductivity was calculated.

EXPLANATIONS OF LETTERS OR NUMERALS 1 positive electrode layer
2 solid electrolyte layer
3 negative electrode layer
10 all-solid-state battery

The invention claimed is:

1. A method for producing a sulfide-based solid electrolyte which comprises:
preparing a homogeneous solution that includes at least elemental lithium (Li), elemental tin (Sn), elemental phosphorus (P) and elemental sulfur (S) in an organic solvent;
removing the organic solvent from the homogeneous solution to obtain a precursor; and
heat-treating the precursor to obtain the sulfide-based solid electrolyte;
wherein the preparing of the homogenous solution comprises:
mixing $Li_2S$ and $P_2S_5$ with each other in the organic solvent to prepare an Li—P—S homogeneous solution;
preparing an Li—Sn—S homogeneous solution that includes at least elemental lithium (Li), elemental tin (Sn) and elemental sulfur (S) in the organic solvent; wherein the preparing of the Li—Sn—S homogeneous solution comprises mixing $Li_2S$, SnS, and S with each other in the organic solvent to prepare the Li—Sn—S homogeneous solution; and
mixing the Li—P—S homogeneous solution and the Li—Sn—S homogeneous solution with each other to prepare the homogeneous solution.

2. The method according to claim 1, wherein the organic solvent is at least one selected from the group consisting of an ether-based solvent, a nitrile-based solvent and an ester-based solvent.

3. The method according to claim 1, wherein the organic solvent is at least one selected from the group consisting of tetrahydrofuran, acetonitrile, ethyl acetate and methyl acetate.

4. The method according to claim 1, wherein during the removing of the organic solvent the temperature is 60 to 280° C.

5. The method according to claim 1, wherein during the heat-treating of the precursor the temperature is 200° C. to 700° C.

6. The method according to claim 1, wherein the sulfide-based solid electrolyte contains an LGPS-based solid electrolyte and has peaks at least $2\theta=19.90°\pm0.50°$, $20.20°\pm0.50°$, $26.70°\pm0.50°$ and $29.20°\pm0.50°$ in X-ray diffraction (CuK$\alpha$: $\lambda=1.5405$ Å).

7. A method for producing a sulfide-based solid electrolyte which comprises:
- preparing a homogeneous solution that includes at least elemental lithium (Li), elemental tin (Sn), elemental phosphorus (P) and elemental sulfur (S) in an organic solvent;
- removing the organic solvent from the homogeneous solution to obtain a precursor; and
- heat-treating the precursor to obtain the sulfide-based solid electrolyte, wherein the preparing of the homogenous solution comprises:
- mixing $Li_2S$ and $P_2S_5$ with each other in the organic solvent to prepare an Li—P—S homogeneous solution;
- preparing an Li—Sn—S homogeneous solution that includes at least elemental lithium (Li), elemental tin (Sn) and elemental sulfur (S) in the organic solvent;
- mixing $Li_2S$ and S with each other in the organic solvent to prepare an Li—S homogeneous solution;
- preparing an Li—Si—S homogeneous solution that includes at least elemental lithium (Li), elemental silicon (Si) and elemental sulfur(S) in the organic solvent; and
- mixing the Li—P—S homogeneous solution, the Li—Sn—S homogeneous solution, the Li—S homogeneous solution and the Li—Si—S homogeneous solution with each other to prepare the homogeneous solution.

8. The method according to claim 7, wherein the preparing of the Li—Si—S homogeneous solution comprises mixing $Li_2S$, $SiS_2$ and S with each other in the organic solvent to prepare the Li—Si—S homogeneous solution.

9. A method for producing a sulfide-based solid electrolyte which comprises:
- preparing a homogeneous solution that includes at least elemental lithium (Li), elemental tin (Sn), elemental phosphorus (P) and elemental sulfur (S) in an organic solvent;
- removing the organic solvent from the homogeneous solution to obtain a precursor; and
- heat-treating the precursor to obtain the sulfide-based solid electrolyte, wherein the preparing of the homogenous solution comprises:
- mixing $Li_2S$ and $P_2S_5$ with each other in the organic solvent to prepare an Li—P—S homogeneous solution;
- preparing an Li—Sn—S homogeneous solution that includes at least elemental lithium (Li), elemental tin (Sn) and elemental sulfur (S) in the organic solvent;
- mixing $Li_2S$ and S with each other in the organic solvent to prepare an Li—S homogeneous solution; and
- mixing the Li—P—S homogeneous solution, the Li—Sn—S homogeneous solution and the Li—S homogeneous solution with each other to prepare the homogeneous solution.

* * * * *